(No Model.)

M. A. ANDREWS.
CAR WHEEL.

No. 447,531. Patented Mar. 3, 1891.

WITNESSES:

INVENTOR
Marian A. Andrews

BY
Smith & Denison
his ATTORNEYS.

UNITED STATES PATENT OFFICE.

MARION A. ANDREWS, OF SYRACUSE, NEW YORK, ASSIGNOR OF ONE-HALF TO JAMES M. ANDREWS, OF SAME PLACE.

CAR-WHEEL.

SPECIFICATION forming part of Letters Patent No. 447,531, dated March 3, 1891.

Application filed July 2, 1890. Serial No. 357,466. (No model.)

*To all whom it may concern*

Be it known that I, MARION A. ANDREWS, of Syracuse, in the county of Onondaga, in the State of New York, have invented new and useful Improvements in Car-Wheels, of which the following, taken in connection with the accompanying drawings, is a full, clear, and exact description.

My invention relates to the construction of wheels for cars, railways, trolleys, cables, &c., which are constructed upon an anti-friction basis.

My object is to produce a combined wheel and an anti-friction bearing located within the wheel and rotating with the rim or tire, and rotated by frictional contact with the inner wall of the tire.

My invention consists in the several novel features of construction and operation hereinafter described, and which are specifically set forth in the claims annexed.

It is constructed as follows, reference being had to the accompanying drawings, in which—

Figure 1:
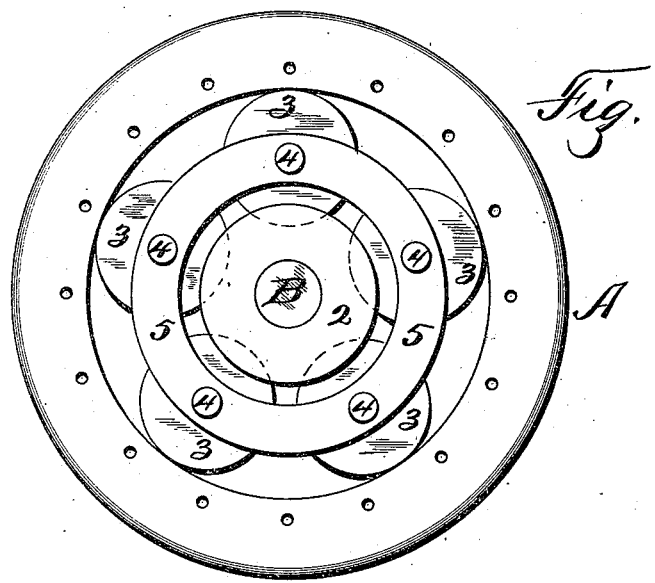
Figure 2:
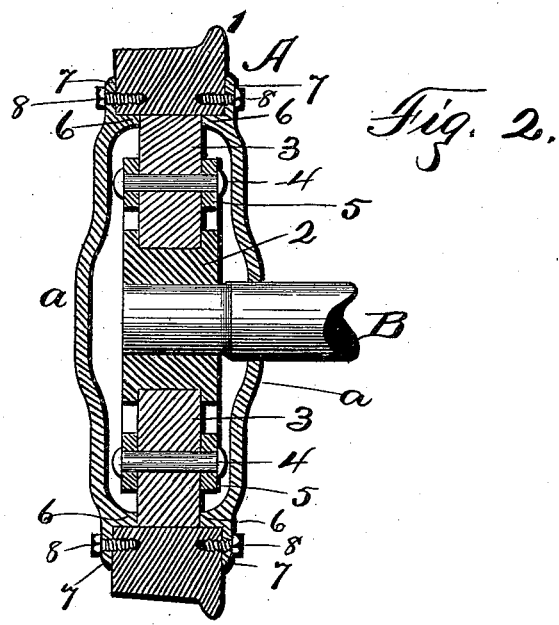

Figure 1 is a front elevation of the wheel with one side cap removed to show the interior. Fig. 2 is a vertical transverse section of the wheel complete.

A is the rim or tire having on its periphery a flange 1, like a car-wheel, and having a plain inner wall.

B is the axle, upon which a grooved ring 2 is mounted or secured, and 3 3 are friction-rollers fitting said groove. Each roller is mounted upon a separate arbor 4, and these arbors are mounted in annular rings 5, on either side of the rollers, and the rollers are held from frictional contact with each other by their arbors. The ends of the tire are closed by plates, caps, or covers a, provided with an inward flange 6 and an outer one 7, the latter fitting upon the ends of the tire, and bolts or screws 8 are inserted through this flange into the tire to secure the caps in position. In Fig. 2 one of them is shown as fitting around the axle. It will be observed that the space between the inward flanges 6 creates a trackway for the rollers 3, and that their other trackway is in the grooved ring 2, that the rotation of the tire rotates the rollers, grooved ring, and axle, when the ring is secured thereto, and that the caps form a rigid support for the tire, operating to steady and stiffen it, and that upon a curve one wheel can rotate faster than the other on the same axle. It will be further seen that I produce a wheel comprising a tire and an anti-friction bearing within the tire, the bearing being inclosed by caps, which can readily be made tight enough so that oil can be carried between the caps, if desired, and that all dust and grit will be excluded from the bearing. It will also be seen that this construction will enable me to dispense with the journal-boxes and brasses now in use upon a car-truck.

What I claim as my invention, and desire to secure by Letters Patent, is—

The combination, with the tire of a wheel, of an anti-friction bearing within the tire, comprising a central tubular ring grooved in its periphery, friction-rollers inserted between and engaging with the inner wall of the tire and the periphery of the ring, separate arbors for the rollers mounted in annular rings, and inwardly-flanged caps secured to and closing the ends of the tire.

In testimony whereof I have hereunto set my hand this 27th day of June, 1890.

MARION A. ANDREWS.

In presence of—
H. P. DENISON,
C. W. SMITH.